Patented Apr. 19, 1932

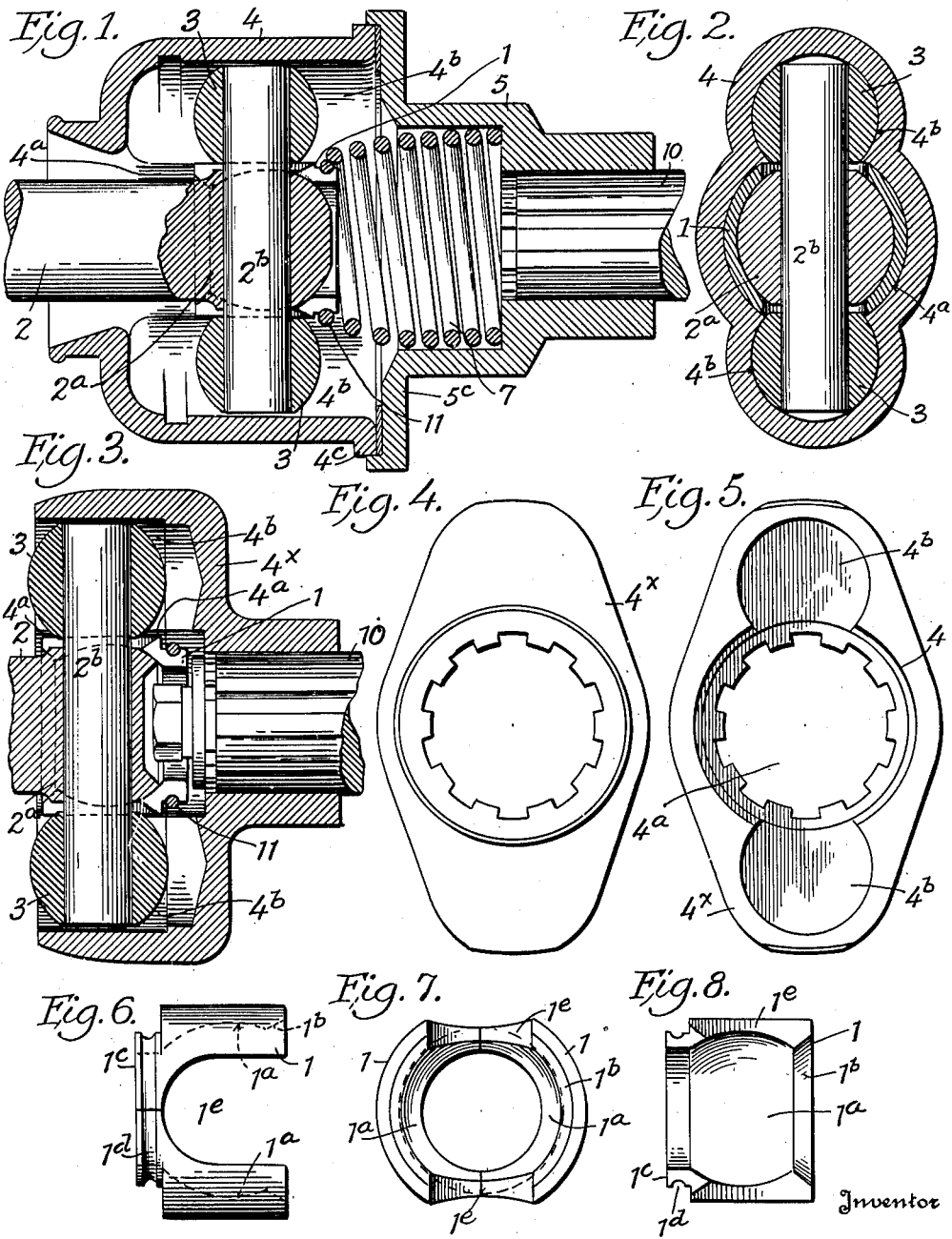

1,854,873

UNITED STATES PATENT OFFICE

ARCHIBALD A. WARNER, OF ROYAL OAK, MICHIGAN, ASSIGNOR TO THE UNIVERSAL PRODUCTS CO., INC., OF DEARBORN, MICHIGAN, A CORPORATION OF DELAWARE

GUIDE AND PROTECTOR FOR UNIVERSAL JOINTS, ETC.

Application filed May 14, 1930. Serial No. 452,487.

This invention is a novel improvement in so-called ball head protectors and spring guides for use in universal joints, particularly such joints as are employed in automobile transmission mechanisms such as shown in patent to J. B. Flick No. 1,512,840, dated October 21, 1924, but the invention is adaptable to various forms of joints of that type in which one member has a spherical or ball shaped head through which passes a pin upon which are rotatably mounted balls or rollers that engage corresponding guides or recesses in a member attached to another shaft; one of the shafts transmitting rotative movement to the other through the interengagement of the balls and grooves of the respective members. For the sake of brevity I will hereinafter refer to the combined guide and protector by the inclusive term "guide".

In the accompanying drawings I have shown the guide applied to a universal joint such as shown in the said Flick patent, and also applied to a transmission coupling such as may be used in a "Ford".

One object of the present invention is to provide a guide which will have a larger area of surface contact with the ball head, and which when fitted thereto will remain in constant engagement therewith, said guide having diametrically opposite parti-spherical recesses engaging diametrically opposite sides of the head; whereby the guide and head will be kept constantly in engagement whether or not there is any spring engaging the guide, or should the spring engaging the guide break.

A further object is to provide a guide which can be made of rod metal, or cast or pressed, and made in complemental parts which can be very easily and readily assembled in operative relation with the ball head and the casing in which the head is entered. Other minor objects of the invention will be hereinafter set forth.

I will describe the invention with reference to the accompanying drawings which however are to be considered as merely exemplifying applications of the invention and not as limiting its use; and an understanding thereof will enable others to adopt and use the invention in connection with other joints, or other applications in the art. The claims summarize the novel features of construction and novel combinations of parts for which protection is desired.

In said drawings:

Fig. 1 is a longitudinal sectional view of a universal joint of the character described in said Flick patent, with my novel guide and protector applied thereto.

Fig. 2 is a sectional view thereof in the plane of the pin.

Fig. 3 is a sectional view of a joint such as may be used in a "Ford" transmission.

Figs. 4 and 5 are opposite end views of the socketed casing member shown in Fig. 3.

Figs. 6 and 7 are respectively top and end views of one of the guides detached, and Fig. 8 is a view of one of the complemental halves of the guide.

The type of joint illustrated in Figs. 1 and 2 comprises a shaft member 2 having a ball head 2a transfixed by a pin 2b on whose ends, at opposite sides of the ball head, are mounted rollers or balls 3. The ball head 2a and balls 3 are entered into one member (4) of a casing preferably composed of two separable members 4 and 5 as shown in the drawings. Part 4 of the casing is provided with an axial bore 4a, slightly larger in diameter than the ball head 2a, and at diametrically opposite sides of bore 4a with slots 4b which open at their inner sides into the outer sides of bore 4a, as shown. The head 2a is entered in bore 4a and balls 3 enter the slots 4b as shown.

The member 4 is open at its outer end, through which the shaft 2 enters, and its inner end is provided with a flange 4c which is attached to a corresponding flange 5c on the other casing member 5 which is formed on or keyed to a shaft 10.

The member 5 is provided with a recess adjacent the inner end of the shaft 10 for the accommodation of an expansion spring 7 which is placed in the casing between the inner end of the shaft 10 and the ball head 2a of the shaft 2.

The improved guide comprises an approximate cylindric tubular body whose exterior diameter preferably corresponds with the internal diameter of bore 4a, and which is preferably somewhat longer than the ball. The guide is preferably divided into two complemental sections or halves 1, on a plane extending axially and longitudinally of the guide; the opposed halves are duplicates of each other and when put together form a complete cylindric tubular body. Each half has a parti-spherical recess 1a in its inner face whose curvature corresponds with the exterior curvature of the ball head 2a; and at the end adjacent the shaft 2, the bore of the body is outwardly flared as at 1b to allow radial movements or swing of the shaft 2. At the opposite end the body has a projecting flange 1c which is preferably recessed, as at 1d, for the reception of a circular retaining spring ring 11 which holds the parts of the body together and prevents them disengaging the head when the head and body are withdrawn from the bore 4a. The body is also provided with diametrically opposite slots 1e to permit the pin 2b to pass therethrough.

The novel guide may be made of cast or wrought or pressed metal, and when engaged with the head will remain in engagement therewith, and the ball head can swing or turn freely in all directions within the guide. In the form shown in Figs. 1 and 2 the guide is capable of longitudinal sliding movements in the bore 4a and will under the action of spring 7 follow up the ball head in any longitudinal movement thereof in the casing. The spring 7 is engaged with the flange 1c and the pressure of said spring is transmitted through the guide to the ball head 2a; and while the ball head can rock within the protector its rocking motions will not be transmitted to the spring 7, nor can the spring chafe or bind on the head. The guide thus protects the ball head from wear by contact with the spring, keeps the spring in exact alignment with the axis of bore 4a, prevents chattering of the spring, and enhances the durability and efficiency of the joint.

In the simple joint shown in Fig. 3 there is not supposed to be any endwise play between the shaft sections 2 and 10 and therefore no spring as 7 is required. In such joint the casing member 4x has a bore 4a for the reception of the guide 1, and diametrically opposite recesses 4b at opposite sides of the guide 4a for engagement of balls 3. The casing member 4x may be splined to the shaft 10 as indicated in the drawings. The shaft 2 has a ball head 2a, transfixed by a pin 2b carrying the balls 3 which engage the recesses 4b in the casing member 4x as shown in Fig. 1. The guide 1 forms a socket or bearing for the ball head within the casing member 4x as is obvious, and prevents cutting, chafing or binding of the head on the edges of the recesses 4b with which the balls 3 are engaged.

When the parts are assembled the space between the ball head 2a and the shaft 10 should be filled with grease so that all the moving parts will be properly lubricated. The operation of the parts will be obvious from the drawings and the foregoing description.

I claim:—

1. For a universal joint of the character specified; a guide adapted to be placed between the ball head of the shaft member of the joint and the casing member thereof; said guide comprising similar complemental halves and having diametrically opposite parti-spherical recesses engaging the ball head and retaining the guide in operative engagement therewith, the exterior portions of the halves of the guide being slidably fitted in the bore of the casing member of the joint.

2. A guide for the purpose specified; comprising a body formed of similar complemental halves, each half having an exterior cylindric portion adapted to engage the bore in the casing member in which the guide is entered, an interior parti-spherical recess adapted to engage the ball head of the joint, a flange at one end for engagement of a retaining member, and diametrically opposite slots for accommodation of the pin on the ball head.

3. For a joint of the character specified; a guide adapted to be placed between the ball head of the shaft member of the joint and the casing member thereof; said guide having diametrically opposite parti-spherical recesses engaging diametrically opposite portions of the said ball head and retaining the guide in operative engagement therewith, and also having an exterior portion slidably fitted in the bore of the joint casing, said guide being longitudinally divided into similar halves.

4. In a universal joint of the character specified; a guide adapted to engage the ball head of the shaft member of the joint, said guide having diametrically opposite parti-spherical recesses engaging diametrically opposite portions of the ball head and retaining the guide in operative engagement therewith, and having an exterior portion slidably engaging the bore in the joint casing; said guide being longitudinally divided into similar halves each having a flange at one end for engagement of retaining means.

5. For a universal joint; a guide formed of similar complemental members and having a longitudinal bore to accommodate the shaft, diametrically opposite parti-spherical recesses for engagement with the ball head of the shaft, a projecting flange at one end of the bore for the accommodation of a retaining spring, the other end of the bore being flared to permit oscillatory movements of the shaft when the ball head is engaged with the guide, and diametrically opposite open slots to accommodate the pin transfixing the head; the exterior of the guide being shaped to engage the bore of the joint casing.

6. In combination with a universal joint comprising a casing having an axial bore and diametrically opposite slots opening into the bore, a shaft entering the casing and having a ball head on its inner end engaging said bore and members mounted on the ball head and respectively entered in said slots; a guide adapted to engage the ball head of the shaft member of the joint, and having diametrically opposite parti-spherical recesses engaging the ball head and retaining the guide in operative engagement therewith.

7. In combination with a universal joint comprising a casing having an axial bore and diametrically opposite slots opening into the bore, a shaft entering the casing and having a ball head on its inner end engaging said bore, and members mounted on the ball head and respectively entered in said slots; a guide adapted to engage the ball head of the shaft member of the joint, said guide having diametrically opposite parti-spherical recesses engaging diametrically opposite portions of the ball head and retaining the guide in operative engagement therewith, and having an exterior portion slidably engaging the bore in the casing; said guide being longitudinally divided into similar halves.

8. In combination with a universal joint comprising a casing having an axial bore and diametrically opposite slots opening into the bore, a shaft entering the casing and having a ball head on its inner end engaging said bore, and members mounted on the ball head and respectively entered in said slots; a guide engaging the ball head and comprising a body formed of similar complemental halves, each half having an exterior cylindric portion adapted to engage the bore in the casing, an interior parti-spherical recess adapted to engage the ball head of the joint, a flange at one end for engagement of a retaining member, and a part-slot at diametrically opposite sides of the bore to accommodate the pin on the ball head.

ARCHIBALD A. WARNER.